United States Patent [19]
Torgrimson

[11] Patent Number: 4,605,237
[45] Date of Patent: Aug. 12, 1986

[54] WIRE REEL CARRIAGE

[75] Inventor: Donald L. Torgrimson, Minot, N. Dak.

[73] Assignee: Main Electric Construction, Inc., Minot, N. Dak.

[21] Appl. No.: 578,675

[22] Filed: Feb. 9, 1984

[51] Int. Cl.⁴ ............................................ B65H 75/40
[52] U.S. Cl. .......................... 280/47.24; 242/86.5 R; 242/95; 280/47.25
[58] Field of Search ......................... 280/47.24, 47.25; 242/86.5 R, 95

[56] References Cited

U.S. PATENT DOCUMENTS

| 501,822 | 7/1893 | Bryce et al. | 280/47.24 |
| 513,129 | 1/1894 | Miller | 280/47.24 |
| 782,015 | 2/1905 | Ernst | 242/86.5 R |
| 966,214 | 8/1910 | Jenks . | |
| 2,389,294 | 11/1945 | Burke | 280/47.24 |
| 2,481,145 | 9/1949 | Nielsen . | |
| 2,705,114 | 3/1955 | Worsham | 242/86.5 R |
| 2,965,327 | 12/1960 | Blary . | |
| 3,831,877 | 8/1974 | Bennett et al. . | |
| 3,854,509 | 12/1974 | Bailey . | |
| 3,856,230 | 12/1974 | Zimmer | 242/86.5 R |
| 3,937,414 | 2/1976 | Bank et al. | 242/86.5 R |
| 4,006,865 | 2/1977 | Howard | 242/86.5 R |
| 4,391,422 | 7/1983 | McDonald | 242/86.5 R |

Primary Examiner—Douglas Hart
Attorney, Agent, or Firm—Merchant, Gould, Smith, Edell, Welter & Schmidt

[57] ABSTRACT

The present invention is a wire reel carriage including a pair of large wheels supported on an axle. The carriage has a support mechanism mounted on the axle for carrying a plurality of reels.

13 Claims, 6 Drawing Figures

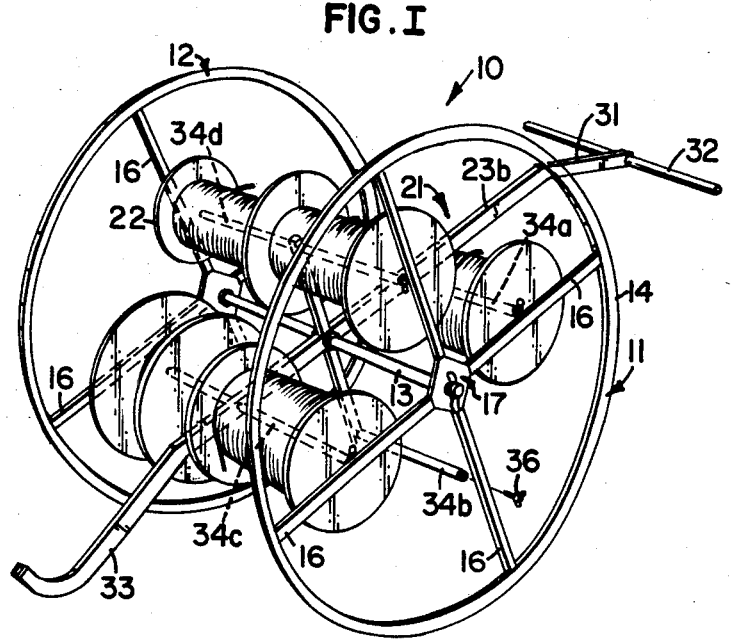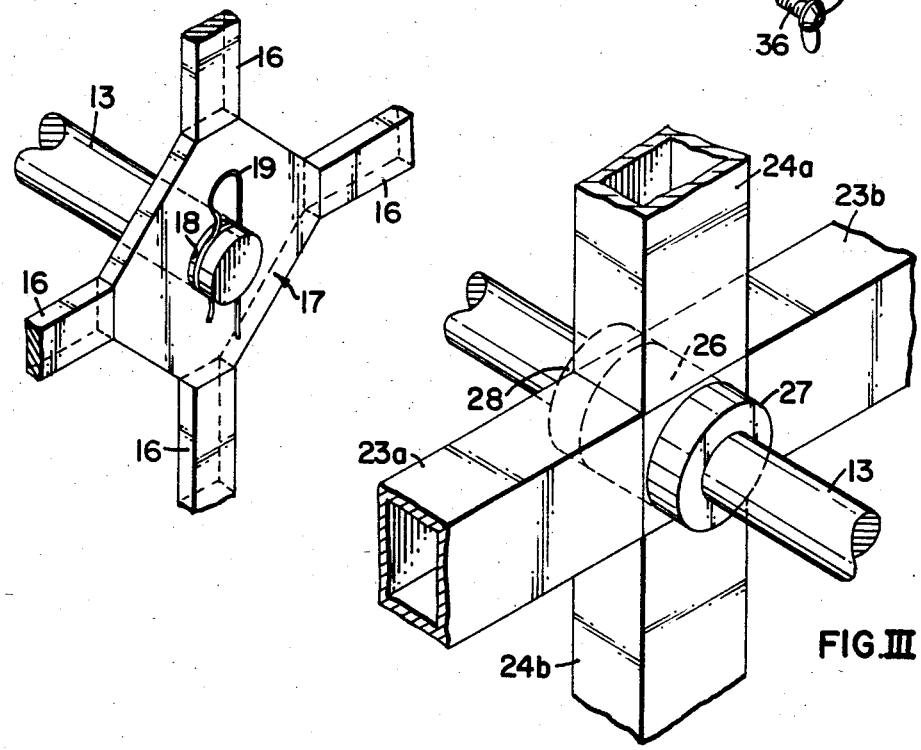

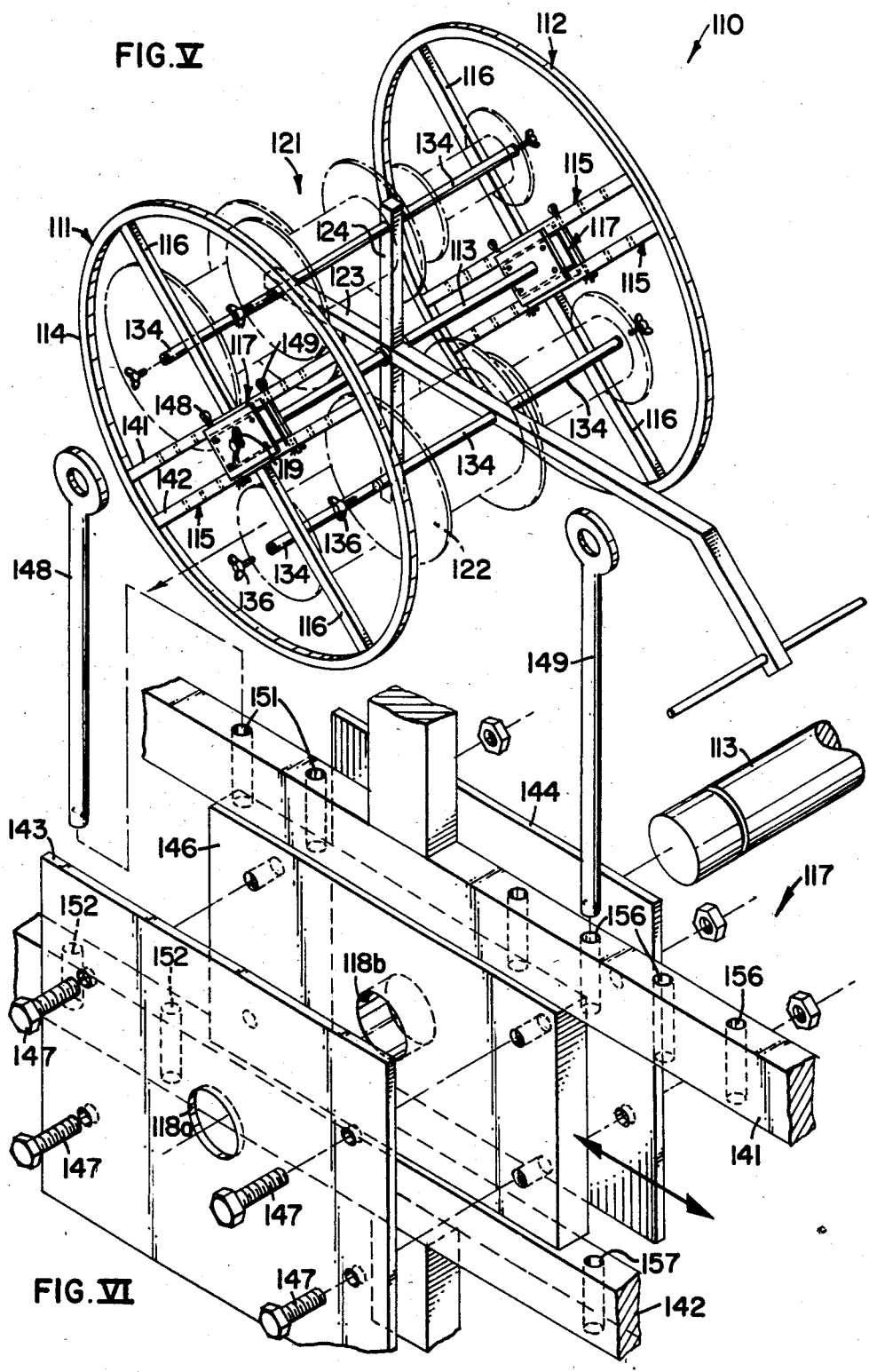

WIRE REEL CARRIAGE

BACKGROUND OF THE INVENTION

The present invention relates to a carriage for transporting reels of electrical wire at the job site.

FIELD OF THE INVENTION

A common problem encountered in electrical contracting is that of handling a plurality of wire reels on the job site. In the past it has been typical for the workmen to manually lift and carry the individual reels of electrical wire from one area of the job site to another. The reels are then typically placed on the floor while wire portions are stripped from the reel. Although such reels are not excessively heavy, they do become a burden to the workmen. Further, depositing the reels on the floor of the construction site often results in wire becoming loosened on the reel, often times entangled, sometimes resulting in a hazardous condition where workmen may trip over the loose wire or the reel. The difficulties are magnified by the fact that strands of various colors must be used in wiring a building. The colors serve as a code to denote the electrically charged wires from the ground wires and return wires. Further, in many constructions a plurality of wire sizes or gauges are used. High amperage circuits may require a six or eight gauge wire whereas low amperage circuits, such as lighting circuits, may use twelve, fourteen or even sixteen gauge wire. All this results in many wire reels being used at a single construction site. Efforts have been made in the past to solve such problems by providing reel carriages mounted on casters. These prior carriages have not been particularly satisfactory since they are difficult to transport and move about the job site.

The present invention overcomes the inherent problems encountered in the past by providing a carriage adapted to transport a plurality of wire reels. The carriage is supported on a pair of large wheels. The workmen need only draw the carriage to different areas of the job site. The reels are held in an elevated position where loose tangled wires are not likely to result.

GENERAL DESCRIPTION OF THE INVENTION

The present invention is a wire reel carriage which includes a pair of large, light weight wheels supported on an axle. The wheels each may have a plurality of spokes secured to a hub. The hub is in turn mounted such as rotatably on the axle. A reel support member is mounted on the axle intermediate the wheels. The support member may comprise a plurality of arms which extend radially from the axle. A reel receiving shaft may be supported near the outer ends of such arms. A wire containing reel may be mounted on each of such shafts. The center of gravity is low. This arrangement of parts makes a very stable structure which may be readily moved about the job site including up and down stairs as well as over and around obstacles and debris. Mechanism may be provided to secure the reels on the respective shaft. This may, for example, be a wing nut which is thread into the end of the shaft.

In a preferred embodiment of the present invention, two spokes may be in the form of a pair of parallel bars which extend across the wheel. The hub, in this embodiment, is slidably mounted between such bars and may be locked, such as by pins, at desired locations along such bars. Such structure is particularly advantageous during the assemblage of the carriage on a job site, such as when larger reels containing substantial weight of wire are encountered.

DESCRIPTION OF THE DRAWINGS

FIG. I shows a perspective view of one embodiment of the present invention;

FIG. II shows a hub portion of the invention shown in FIG. I;

FIG. III shows a portion of the reel support of FIG. I;

FIG. IV shows a securing device for the reel shaft of FIG. I;

FIG. V shows a perspective view of a further embodiment of the present invention; and FIG. VI shows a slidable hub portion of the embodiment shown in FIG. V.

DETAILED DESCRIPTION OF THE PRESENT INVENTION

The carriage 10 of the present invention, one embodiment of which is illustrated in FIGS. I–IV includes a pair of wheels 11 and 12 rotatably mounted on an axle 13. The wheels may be substantially indentical in construction, for example, wheel 11 may include a rim 14 and a plurality of spokes 16. The spokes 16 may terminate at their respective inner ends in a hub 17. The rim 14, spokes 16 and hub 17 may be of any suitable material, for example, rim 14 may be hollow tubing having an external diameter of one-half to three-quarters of an inch. The spokes 16 may be of metal strap stock, whereas the hub 17 may be of metal plate. The spokes 16 may be welded at their respective outer ends to the rim 14 as well as to the hub 17. The spokes 16 in wheel 11 may be spaced sufficiently from each other to permit insertion of wire reels therebetween for purposes hereinafter discussed. The hub 17 has an opening 18 defined in the center thereof through which axle 13 may extend. The opening 18 snuggly engages the hub 17 to permit ready mounting and dismounting of the wheel 11 on the axle 13 and yet minimize wobbling of the wheel 11 during usage. The wheel 12 may be a mirror image of wheel 11. The wheel 11 may be held on axle 13 by any suitable mechanism such as clip 19. The wheel 11, for example, may have a diameter of at least 20 inches preferrably at least 40 inches.

The carriage 10 includes a support member 21 suitable for carrying a plurality of wire containing reels 22. The support 21 is mounted intermediate the wheels 11 and 12 on axle 13. The support 21 may include a plurality of radially extending arms such as 23a, 23b, 24a and 24b. The arms 23a, 23b, 24a and 24b may include a hub portion 26 suitable for mounting on the axle 13. A pair of hub locks 27, 28 may be used to maintain the support 21 at the desired location along axle 13. Hub locks 27, 28 may be held in place for example with set screws (not shown). The arms 23a, 23b, 24a and 24b may for example be constructed of strap stock or rectangular tubing.

A drawbar portion 31 may be provided as an extension of arm 23b. The drawbar 31 may include a handle 32 suitable for grasping by workmen during movement of the carriage 10 on the job site. A leg rest 33 may be provided as an extension of support arm 23a. The support 21 may have a plurality of radially extending reel shafts such as 34a, 34b, 34c and 34d. The shafts 34a–d extend through the arms 23a, 23b, 24a, 24b and may be secured thereto such as by lock screws or other fastening mechanism. The diameters of the shafts 34a–d are suitable for reception of conventional wire containing reels 22. The reels 22 may be mounted by insertion through the wheel 11 between adjacent spokes 16. The reels 22 may be secured in place on the shafts 34a such as by wing screw 36.

OPERATION OF THE INVENTION

Although operation of the invention is readily apparent from FIGS. I–IV and the corresponding description, it will be further set forth in order to provide a more complete understanding of the present invention.

The carriage 10 of the present invention may be moved from one job site to another in a disassembled condition thereby providing for a compact transportation such as in a pick-up truck or a panel truck. For example, the wheels 11 and 12 may be removed from the axle 13 during such transportation and remounted at the job site. The wire reels 22 may be transported while mounted on the support 21 or removed from the support 21. The reels 22 are slipped onto the shafts such as 34a–d and locked in place with the wing screw 36. The wheels 11 may be mounted on the ends of shaft 13 and locked in place with clip 19. The workmen may then roll the carriage along the construction area to the point at which wire will be stripped from the reels 22. Since the carriage 10 may support a plurality of reels 22, the workmen need make only one trip to a given location at the job site rather than carrying the separate reels one at a time. Wire is then stripped from the individual reels 22 as needed. When the workman moves from one work location on the job site to another, he merely grasps the carriage 10 by the handle 32 and rolls the entire carriage 10 to the next location. The spokes are spaced sufficiently that the reels may be mounted on the shafts 34a–d by insertion between adjacent spokes. As can be readily seen, the carriage provides for efficiency in effort as well as minimizing entanglement and undesired stripping of the wire from the reels 22.

ALTERNATIVE EMBODIMENT

An alternative embodiment carriage 110 is illustrated in FIGS. V and VI. The reel carriage 110 has a pair of wheels 111, 112 which are supported on an axle 113. A reel support 121 is also supported on axle 113 intermediate the wheels 111, 112. The reel support 121 includes a plurality of radially extending arms 123, 124 with axially extending shafts 134. The shafts 134 are adapted for reception of wire containing reels 122. The reel support 121 is mounted intermediate the wheels 111, 112. The shaft 134 may have suitable keepers 136 for maintaining the reels 122 on the shafts 134.

The wheels 111, 112 may be mirror images of each other. Wheel 111 includes radially extending spokes 115 and 116. The spoke 115 includes a pair of parallel bars 141, 142 which extend from one side of the rim 114 to the opposite side. The inner ends of spoke 116 may be secured to either member 141 or 142 of spoke 115. The outer ends of spoke 116 may be welded to rim 114. A hub 117 is slidably mounted between members 141 and 142. The axle 113 may be rotatably mounted in the hub 117 with the wheel 111 and 112 being held on axle 113 such as by clip 119. The hub 117 is illustrated in an exploded view in FIG. VI. Hub 117 includes an outer plate 143, an inner plate 144 and a center spacer 146. Members 143, 144 and 146 may be held together such as by bolts 147. When assembled a slot is provided between plates 143 and 144 which snuggly but slidably receives bars 141, 142. The members 143, 144 and 146 each have a central opening such as 118a, 118b for reception of the axle 113. The hub 117 further includes a pair of keys 148, 149 which may be inserted through openings such as 151 and 152 in bars 156, 157, respectively. The keys 148 and 149 locate the hub 117 with respect to the members 141, 142.

Carriage 110 operates in a manner substantially like that described with respect to carriage 10. However, carriage 110 has the further advantage of faciliatating easy lifting of a heavily loaded wire reel support at the time of assembling at a construction site. For example, the support 121 may be resting on a surface. The hubs 117 may be slid along members 141, 142 until the openings 118 match with the elevation of the shaft 113. The wheels are then mounted on axle 113 and the clip 119 is inserted. The key 149 is inserted at the desired location in members 141, 142. Wheel 112 is similarly mounted. The wheels 111, 112 are then rotated until spoke 115 has just past the horizontal position. Hub 117 then slides along members 141, 142 until it engages pin 149, with the hub 117 being centered with respect to the wheels 111, 112. Pin 148 is then inserted such as in openings 156, 157 thus locking the hub 117 in the center of wheels 111, 112. It is to be recognized that various modifications can be made with respect to the present invention. For example, the carriage may be constructed of materials other than metal stock.

What is claimed is:

1. A carriage for transporting reels of electric wire, said carriage comprising:
   a pair of large light weight wheels, said wheels being axially aligned and spaced from each other;
   axle means extending between said pair of wheels;
   means for supporting a plurality of reels of electric wire, said support means being mounted on said axle means intermediate said wheels, said support means comprising a plurality of elongated arms extending radially from said axle means at spaced locations around said axle means, said support means further including reel support shafts carried by said arms, said reel support shafts being disposed near the radially outer ends of said arms, said shafts each being adapted to rotatably support at least one wire carrying reel;
   said wheels each including a plurality of spokes, said spokes being spaced sufficiently to permit insertion and removal of wire reels therebetween for mounting and dismounting on said reel support shafts; and
   drawbar means for drawing said carriage from one location on a construction site to another.

2. The carriage of claim 1 wherein said wheels are retained on said axle means by an easily removable clip.

3. The carriage of claim 1 wherein said reel supporting shafts each including means for axially securing a reel on said shaft.

4. The carriage of claim 1 wherein said carriage includes a rearwardly extending leg for limiting the rotation of said reels around said axle means.

5. The carriage of claim 1, wherein said wheels each comprise an outer rim, a plurality of radially inwardly extending spokes and a center hub, said center hub having an opening therein for rotatable reception of said axle means.

6. The carriage of claim 5 wherein said spokes include a pair of parallel bars extending from one portion of said rim to the opposite portion of said rim, said hub being slidably mounted between said parallel bars, said carriage further including means for locking said hub at various locations along said parallel bars.

7. A carriage for handling reels of electric wire, said carriage comprising:
- a pair of large light weight wheels, said wheels being axially aligned and spaced from each other;
- axle means extending between and supporting said pair of wheels;
- means for supporting a plurality of reels of electric wire with respect to said wheels and axle means, said support means being disposed intermediate said wheels, said support means including a plurality of reel support shafts and means for supporting said shafts with respect to said axle means, said wheels each including a plurality of spokes, said spokes being spaced sufficiently to permit insertion of wire reels therebetween for mounting on said reel support shafts without removal of said wheels; and
- means for drawing said carriage from one location at a construction site to another.

8. The carriage of claim 7, wherein said carriage includes a hub associated with each of said wheels and means for slidably supporting said hub with respect to said wheel.

9. A carriage for handling reels of electric wire, said carriage comprising:
- a pair of large light weight wheels, said wheels being axially aligned and spaced from each other;
- axle means extending between and supporting said pair of wheels, said carriage including a hub associated with each of said wheels and means for slidably supporting said hub with respect to said wheel, said slidable support means including a pair of parallel bars;
- means for supporting a plurality of reels of electric wire with respect to said wheels and axle means, said support means being disposed intermediate said wheels, said support means including a plurality of reel support shafts and means for supporting said shafts with respect to said axle means; and
- means for drawing said carriage from one location at a construction site to another.

10. The carriage of claim 7 wherein said wheels each have a diameter of at least 16 inches.

11. The carriage of claim 7 wherein said wheels each have a diameter of at least 34 inches.

12. A carriage for handling reels of electric wire, said carriage comprising:
- a pair of large light weight wheels, said wheels being axially aligned and spaced from each other;
- axle means extending between and supporting said pair of wheels;
- means for supporting a plurality of reels of electric wire with respect to said wheels and axle means, said support means being disposed intermediate said wheels, said support means including a plurality of reel support shafts and means for supporting said shafts with respect to said axle means, a plurality of reels disposed on said support shafts, said reels being located entirely within a cylindrical zone defined by the circumference of said wheels;
- means for drawing said carriage from one location at a construction site to another.

13. The carriage of claim 7, wherein said carriage includes a hub associated with each of said wheels and means for slidably supporting said hub with respect to said wheel said slidable means providing for positioning of said hub off center with respect to said wheels.

* * * * *